E. BOSNYAKOVITS.
CAR FENDER.
APPLICATION FILED DEC. 27, 1912.
1,067,779.
Patented July 15, 1913.
2 SHEETS—SHEET 1.
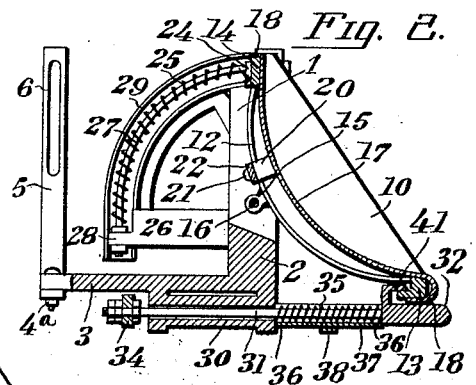
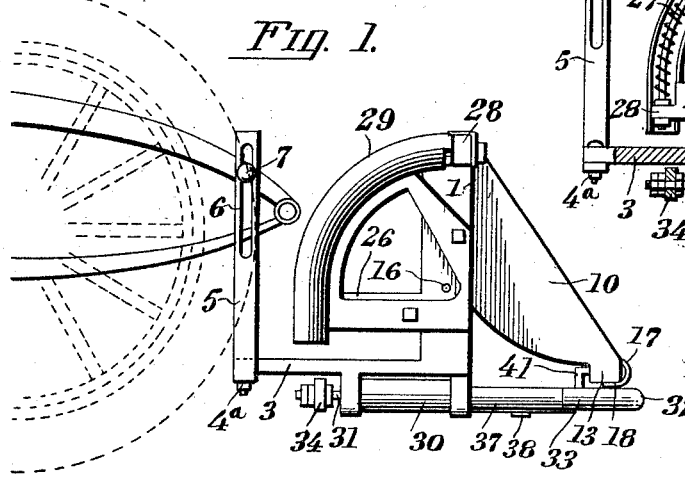
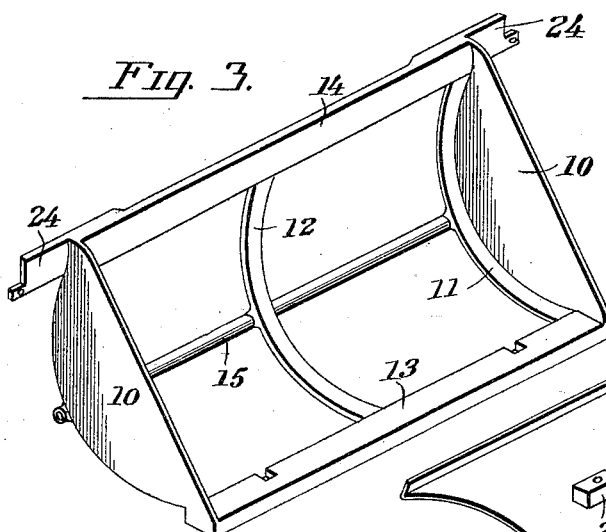
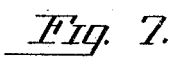
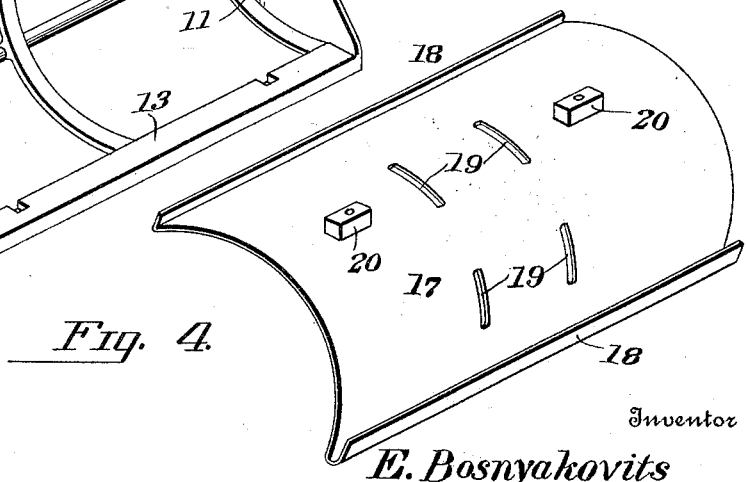
Witnesses
M. F. Garnett
P. M. Smith
Inventor
E. Bosnyakovits
By Victor J. Evans
Attorney

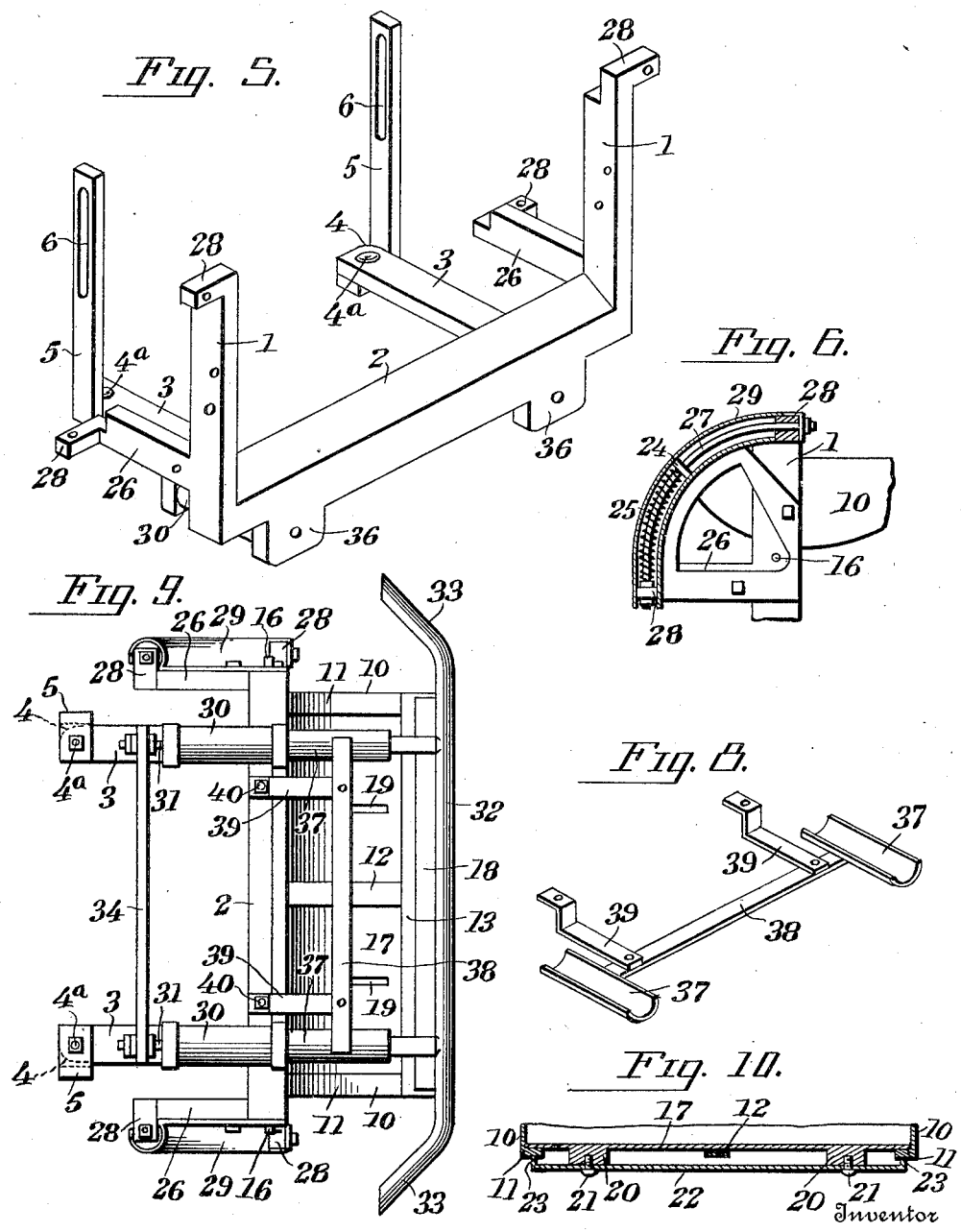

UNITED STATES PATENT OFFICE.

EUGENE BOSNYAKOVITS, OF CLEVELAND, OHIO.

CAR-FENDER.

1,067,779.

Specification of Letters Patent.  Patented July 15, 1913.

Application filed December 27, 1912. Serial No. 738,877.

*To all whom it may concern:*

Be it known that I, EUGENE BOSNYAKOVITS, a subject of the King of Hungary, residing at Cleveland, in the county of Cuyahoga and State of Ohio, have invented new and useful Improvements in Car-Fenders, of which the following is a specification.

This invention relates to car fenders, and is especially designed for use on automobiles and other mechanically propelled vehicles, but is also applicable to street railway cars of all kinds, and embodies means whereby the fender as a whole may be adjusted to the frame of any automobile or car, so as to dispose the fender at the proper elevation and distance from the ground or track along which the car is moving.

One of the main objects of the present invention is to provide, in connection with a fender frame, a pivoted and tiltable scoop combined with a pilot tripping bar which is so related to the scoop as to hold the leading edge of the scoop in a depressed position, ready to receive a person or object, the scoop being tilted backwardly, so as to elevate the leading edge thereof, by means of a spring, when released by the pilot bar as the latter moves rearwardly under impact of such person or object.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a sufficient portion of an automobile to illustrate the relation of the fender thereto, and the manner in which it is supported thereon. Fig. 2 is a vertical fore and aft section taken in line with one of the guide rods of the pilot bar. Fig. 3 is a detail perspective view of the scoop. Fig. 4 is a similar view of the apron. Fig. 5 is a similar view of the fender frame and the attaching hangers therefor. Fig. 6 is a detail vertical section, showing one of the guides and springs for tilting the scoop. Fig. 7 is a detail perspective view of one of the spring guards. Fig. 8 is a detail perspective view of the pilot bar supporting guide. Fig. 9 is a bottom plan view of the whole fender. Fig. 10 is a horizontal section, showing the apron clamp and the parts connected thereby.

The fender contemplated in this invention comprises essentially a fender frame, embodying side uprights 1, and a horizontal bar 2 connecting the same. This frame is made of sufficient width to extend across the front of the motor or other car, and the front wheels thereof, so as to support a scoop of corresponding horizontal dimensions, and prevent the person or object from passing under the wheels of the car.

Extending rearwardly from the cross bar 2 are arms 3, the rear ends of which are rounded, as shown at 4, and have connected thereto, by means of vertical bolts $4^a$ which act as pivots, L-shaped hangers 5 for attaching the fender frame to the frame of a car, the connection formed by the bolts 4 enabling the hangers to be turned on a vertical axis, so that they may be connected either to the outside or inside faces of the side bars or bed rails of the car.

The upwardly extending portion of each of the hangers 5 is longitudinally slotted, as at 6, so as to be capable of adjustment up and down on a bolt 7 which forms the connecting means between the fender as a whole and the frame of the car. This allows the fender to be set at the proper distance from the ground or track.

The scoop embodies a skeleton frame which is generally concavo-convex in vertical cross section, as illustrated, said scoop frame embodying the opposite side or cheek pieces 10, and a plurality of cross bars 11 and 12, 11 designating the end cross bars, and 12 one or more intermediate cross bars, all of said bars being curvilinear and being connected at the leading edge by a cross bar 13, and at the trailing or rear edge by a cross bar 14, and intermediate the bars 13 and 14 by one or more additional cross bars 15. This scoop frame is pivotally supported, at 16, on a horizontal axis between the uprights of the fender frame.

A flexible sheet metal apron 17, concavo-convex in cross section, connects the front and rear members of the skeleton frame of the scoop, the front and rear edges of the apron being bent, as shown at 18, to extend over and partially embrace the front and rear bars of the scoop frame, as shown, and being further provided with slots or holes 19, enabling a facing or cushion of any suitable description to be applied to the concaved face of the apron to cushion the blow imparted by the fender to the person or object struck thereby, the effect of the cushion being enhanced by the flexibility of the apron itself.

In order to more securely fasten the apron to the scoop frame, the apron is provided on its convex side with flat faced lugs 20 which receive screws 21, or their equivalent, passing through a clamping bar 22, the opposite ends of which are bent to form short feet 23 which bear firmly against the convex faces of the end bars of the scoop frame, as clearly illustrated in Fig. 10. By this means, a new apron may be quickly substituted for an apron which has become bent or injured in service, and this may be accomplished without detaching the scoop frame.

The scoop frame is provided at the upper or rear corners thereof with extensions 24 which project beyond the sides of the scoop, and have attached thereto the ends of coiled contractile springs 25, the opposite ends of which are attached to rearwardly extending arms 26 of the side uprights 1. The springs 25 encircle curvilinear guides 27 which are terminally secured to the outwardly projecting lugs 28 at opposite sides of the fender frame, said guides forming bearings for the springs 25, during the tilting movement of the scoop. The springs normally act to pull down the rear or trailing edge of the scoop, when the scoop is released by the tripping means hereinafter described.

Fastened to the vertical and horizontal portions of the side uprights of the fender frame are curved guards 29 which house the scoop tilting springs and their guides, and prevent injury thereto.

The fender frame is provided on the bottom thereof with fixed tubular guides 30, through which pass parallel guide rods 31 extending rearwardly from and rigidly attached to a horizontal pilot tripping bar 32 having the opposite ends thereof rearwardly deflected or curved, as shown at 33. At their rear ends, the guide rods are connected by a tie bar 34, and said guide rods are encircled by coiled expansion springs 35 which are interposed between shoulders 36 on said guide rods and the forward ends of the tubular guides 30. These springs serve to normally hold the pilot bar at the forward limit of its movement, while permitting it to yield rearwardly. The guide rods 31 are further sustained by means of gutter-shaped supporting guides 37 connected together by a bar or yoke 38, from which project rearwardly extending attaching arms 39 secured to the cross bar 2 of the fender frame by bolts 40, or the equivalent thereof.

The pilot or trip frame, hereinabove described, is provided on the upper side thereof with forwardly projecting latch lips 41 which are normally held in engagement with the front cross bar of the scoop frame by the pressure of the springs surrounding the guide rods of the pilot bar, the arrangement being such that when the pilot bar is thrust rearwardly, said latch lips move out of engagement with the scoop frame, whereupon the springs connected with the scoop frame immediately tilt the scoop, depressing the rear edge thereof and elevating the front edge, so as to properly support and hold the body or object contained therein and prevent the same from being thrown outwardly in the roadway or upon the track in front of the car.

When the scoop is in its normal or catching position, the leading edge thereof is supported by the pilot bar and the guide rods extending backwardly therefrom, the guide rods being in turn supported by the gutter-shaped guides underlying the same. In this way, an effective support is provided for the scoop, when in position for use.

From the foregoing description, it will now be understood that as soon as the pilot bar comes into contact with a person or object, it is thrust back by force of the impact, thereby moving the latch lips out of engagement with the scoop frame. Immediately, the springs at opposite sides of the fender frame act to tilt the scoop to a suitable horizontal position, thereby picking up the person or object and holding the same in a position of safety.

What is claimed is:

1. A car fender, comprising a fender frame embodying side uprights and a cross bar connecting said uprights, a scoop pivotally supported on a horizontal axis by and between said uprights, a pilot trip bar projecting in advance of and supporting the leading edge of the scoop and extending parallel to the axis of the scoop, a latch lip carried by the pilot bar and normally engaging the front bar of the scoop to hold the leading edge thereof depressed, and a spring for depressing the trailing edge of the scoop when the latter is tripped and released by the pilot bar.

2. A car fender, comprising a fender frame embodying side uprights and a cross bar connecting said uprights, a scoop pivotally supported on a horizontal axis by and between said uprights, a pilot trip bar projecting in advance of the leading edge of the scoop and extending parallel to the axis of the scoop, a latch lip carried by the pilot bar and normally engaging the scoop to hold the leading edge thereof depressed, a spring for depressing the trailing edge of the scoop when the latter is tripped and released by the pilot bar, scoop supporting guide rods extending backwardly from the pilot bar, and gutter-shaped supporting guides on the fender frame in which said rods slide.

3. A car fender, comprising a fender frame embodying side uprights and a cross bar connecting said uprights, a scoop pivotally supported on a horizontal axis by and between said uprights and embodying a skeleton frame, a flexible sheet metal apron attached at its front and rear edges to the scoop frame, a pilot trip bar projecting in advance of the leading edge of the scoop and extending parallel to the axis of the scoop, a latch lip carried by the pilot bar and normally engaging the scoop to hold the leading edge thereof depressed, and a spring for depressing the trailing edge of the scoop when the latter is tripped and released by the pilot bar.

4. A car fender, comprising a fender frame embodying side uprights and a cross bar connecting said uprights, a scoop pivotally supported on a horizontal axis by and between said uprights, a pilot trip bar projecting in advance of the leading edge of the scoop and extending parallel to the axis of the scoop, a latch lip carried by the pilot bar and normally engaging the scoop to hold the leading edge thereof depressed, a curvilinear guide for the scoop described on an arc of which the axis of movement of the scoop is the center, and a spring coiled around said guide and operating to depress the trailing edge of the scoop when the latter is tripped and released by the pilot bar.

5. A car fender, comprising a fender frame embodying side uprights and a cross bar connecting said uprights, a scoop pivotally supported on a horizontal axis by and between said uprights, a pilot trip bar projecting in advance of the leading edge of the scoop and extending parallel to the axis of the scoop, a latch lip carried by the pilot bar and normally engaging the scoop to hold the leading edge thereof depressed, a spring for depressing the trailing edge of the scoop when the latter is tripped and released by the pilot bar, arms extending backwardly from the fender frame, and slotted hangers on said arms for attaching the fender frame to a car and adjusting the fender frame up and down.

6. A car fender, comprising a fender frame embodying side uprights and a cross bar connecting said uprights, a scoop pivotally supported on a horizontal axis by and between said uprights, a pilot trip bar projecting in advance of the leading edge of the scoop and extending parallel to the axis of the scoop, a latch lip carried by the pilot bar and normally engaging the scoop to hold the leading edge thereof depressed, a spring for depressing the trailing edge of the scoop when the latter is tripped and released by the pilot bar, arms extending backwardly from the fender frame, and slotted hangers on said arms for attaching the fender frame to a car and adjusting the same vertically, the hangers being jointed to said arms on vertical axes.

7. A car fender, comprising a fender frame embodying side uprights and a cross bar connecting said uprights, a scoop pivotally supported on a horizontal axis by and between said uprights, a pilot trip bar projecting in advance of the leading edge of the scoop and extending parallel to the axis of the scoop, a latch lip carried by the pilot bar and normally engaging the scoop to hold the leading edge thereof depressed, a curvilinear guide for the scoop, a spring coiled around said guide and operating to depress the trailing edge of the scoop when the latter is tripped and released by the pilot bar, and a channeled guard which houses the scoop tilting spring and its guide.

In testimony whereof I affix my signature in presence of two witnesses.

EUGENE BOSNYAKOVITS.

Witnesses:
 LOUIS TOTH,
 JOSEPH BOSNYAKOVITS.

---

Copies of this patent may be obtained for five cents each, by addressing the "Commissioner of Patents, Washington, D. C."